US012597805B2

(12) United States Patent
Saeki et al.

(10) Patent No.: US 12,597,805 B2
(45) Date of Patent: Apr. 7, 2026

(54) WIRELESS POWER TRANSFER SYSTEM

(71) Applicants:Murata Manufacturing Co., Ltd., Kyoto (JP); NATIONAL UNIVERSITY CORPORATION TOYOHASHI UNIVERSITY OF TECHNOLOGY, Aichi (JP)

(72) Inventors: Hiromasa Saeki, Nagaokakyo (JP); Masaya Tamura, Toyohashi (JP); Yoshinobu Tamura, Toyohashi (JP); Suzuka Akai, Toyohashi (JP)

(73) Assignees: Murata Manufacturing Co., Ltd., Kyoto (JP); NATIONAL UNIVERSITY CORPORATION TOYOHASHI UNIVERSITY OF TECHNOLOGY, Aichi (JP)

( * ) Notice: Subject to any disclaimer, the term of this patent is extended or adjusted under 35 U.S.C. 154(b) by 0 days.

(21) Appl. No.: 18/804,204

(22) Filed: Aug. 14, 2024

(65) Prior Publication Data

US 2024/0413665 A1 Dec. 12, 2024

Related U.S. Application Data

(63) Continuation of application No. PCT/JP2023/001128, filed on Jan. 17, 2023.

(30) Foreign Application Priority Data

Feb. 18, 2022 (JP) ................................. 2022-023872

(51) Int. Cl.
| | |
|---|---|
| *H01P 7/06* | (2006.01) |
| *H02J 50/12* | (2016.01) |
| *H02J 50/70* | (2016.01) |

(52) U.S. Cl.
CPC ................ *H02J 50/12* (2016.02); *H01P 7/06* (2013.01); *H02J 50/70* (2016.02)

(58) Field of Classification Search
CPC .............. H02J 50/12; H02J 50/70; H01P 7/06
See application file for complete search history.

(56) References Cited

FOREIGN PATENT DOCUMENTS

| | | | |
|---|---|---|---|
| JP | H11239012 A | * | 8/1999 |
| JP | 2019-041529 A | | 3/2019 |
| JP | 2019-092251 A | | 6/2019 |

OTHER PUBLICATIONS

Mei, Cavity Resonator Wireless Power Transfer System for Freely Moving Animal Experiments (Year: 2017).*

(Continued)

*Primary Examiner* — Elim Ortiz
(74) *Attorney, Agent, or Firm* — Studebaker Brackett PLLC

(57) ABSTRACT

A wireless power transfer system includes a cavity resonator entirely surrounded by an electromagnetic wave shielding member having appropriate conductivity and frequency selectivity; at least one power reception unit; at least one power transmission unit; and at least one resonator (e.g., a resonant network). In an equivalent circuit of the wireless power transfer system from a power transmission circuit of the power transmission unit to a power reception circuit of the power reception unit, N (N≥2) resonators including the cavity resonator are connected in series via an inverter on a power transmission route from the power transmission circuit to the power reception circuit.

16 Claims, 13 Drawing Sheets

(56)                References Cited

OTHER PUBLICATIONS

Sushia Rahimizadeh et al.; "Scalable adaptive wireless powering of multiple electronic devices in an over-moded cavity"; IEEE Xplore; Conference Paper: Wireless Power Transfer (WPT); May 2013; pp. 84-87.
Henry Mei et al.; "Cavity Resonator Wireless Power Transfer System for Freely Moving Animal Experiments"; IEEE Transactions on Biomedical Engineering; vol. 64, No. 4; Apr. 2017; pp. 775-785.
International Search Report issued in PCT/JP2023/001128; mailed Mar. 28, 2023.

* cited by examiner

10a

12

13

2

11

14

15

Z

Y

X

L=200mm          L=150mm          L=100mm

L=600mm          L=385mm          L=200mm

WIRELESS POWER TRANSFER SYSTEM

CROSS-REFERENCE TO RELATED APPLICATIONS

This application claims benefit of priority to International Patent Application No. PCT/JP2023/001128, filed Jan. 17, 2023, and to Japanese Patent Application No. 2022-023872, filed Feb. 18, 2022, the entire contents of each are incorporated herein by reference.

BACKGROUND

Technical Field

The present disclosure relates to a wireless power transfer system. More specifically, the present disclosure relates to technology regarding antenna shortening and broadbanding for wireless power transfer.

Background Art

Along with a recent explosive increase of Internet of Things (IOT) devices, there have been problems arising with the method of supplying power to such devices. It is difficult to establish wire connection to a vast number of devices, and it is very laborious to replace exhausted batteries when the batteries are used as the power source. Technology to wirelessly transfer power has been expected to solve these problems.

A publication by S. Rahimizadeh, S. Korhummel, B. Kaslon, Z. Popovic, entitled "Scalable adaptive wireless powering of multiple electronic devices in an over-moded cavity," Conference Paper: Wireless Power Transfer (WPT), 2013 IEEE (hereinafter "Non-Patent Literature 1") discloses a wireless power transfer system in which a space surrounded by metal is utilized as a resonator (hereinafter referred to as "cavity resonator"). In this system, electromagnetic waves are emitted from a power transmission unit at a resonance frequency specific to the cavity resonator so as to transmit power to a power receiver in the cavity resonator (referred to as "cavity resonant wireless power transfer system"). Non-Patent Literature 1 specifically discloses the relationship of resonance frequency versus size and resonance mode of the cavity resonator.

A publication by H. Mei, K. A. Thanckston, R. A. Bercich, J. G. R. Jefferys, and P. P. Irazoqui, entitled "Cavity Resonator Wireless Power Transfer System for Freely Moving Animal Experiments," IEEE Biomed. Eng., Vol. 64, No. 4, pp. 775-785, June 2016 (hereinafter "Non-Patent Literature 2") discloses a wireless power transfer system in which a space surrounded by metal is utilized as a resonator. In this system, electromagnetic waves are emitted from a power transmission unit at a resonance frequency specific to the cavity resonator so as to transmit power to a power receiver in the cavity resonator. According to Non-Patent Literature 2, the resonance frequency changes depending on an object inside the cavity resonator.

SUMMARY

As shown in Non-Patent Literature 1, in the cavity resonant wireless power transfer system, a space surrounded by an electrical conductor is utilized as a resonator. Such a system performs wireless power transfer using electromagnetic waves set at a resonance frequency determined based on the size and resonance mode of the cavity resonator.

Thus, power transmission requires the resonance frequency to be predetermined in some way prior to use of electromagnetic waves.

However, as shown in Non-Patent Literature 2, when an object is inside the cavity resonator, the average relative permittivity of the space changes, which unfortunately causes changes in the resonance frequency. In other words, in an environment where the content and position of the object inside thereof change, the power may not be suitably transferred at the pre-set resonance frequency.

In the assumed case of a system that wirelessly transfers power to ITO devices in an actual-use environment by utilizing a space such as a factory or warehouse as a cavity resonator, the IOT devices and other objects in the cavity resonator are not always arranged in a constant pattern. In other words, the resonance frequency is expected to change from time to time.

Here, when the resonance frequency changes beyond the band of a power transmitter and receiver used for power transmission and reception, the power transmission and reception efficiency is likely to be reduced significantly.

The present disclosure aims to provide a wireless power transfer system capable of broadening the band of the power transmitter and receiver while maintaining the conductor line dimensions and the efficiency of the power transmitter and receiver, in order to enable wireless power transmission regardless of the arrangement, number, and materials of an object(s) inside the cavity resonator.

As another application, the present disclosure aims to provide a wireless power transfer system capable of reducing the conductor line dimensions while maintaining the band and the efficiency of the power transmitter and receiver.

The term "conductor line" as used herein refers to a portion corresponding to an antenna for usual electromagnetic radiation and is synonymous to an antenna in the sense that electromagnetic waves are radiated.

The wireless power transfer system of the present disclosure includes a structure entirely surrounded by an electromagnetic wave shielding member having appropriate conductivity and frequency selectivity, i.e., a cavity resonator; at least one power reception unit; at least one power transmission unit; and at least one resonator.

In an equivalent circuit of the wireless power transfer system of the present disclosure from a power transmission circuit of the power transmission unit to a power reception circuit of the power reception unit, N (N≥2) resonators including a cavity resonator are connected in series via an inverter on a power transmission route from the power transmission circuit to the power reception circuit. In an embodiment, a resonant network is connected to one or each of a conductor line of the power transmitter and a conductor line of the power receiver. Here, the resonant network is placed between the conductor line and power transmission circuit of the power transmitter or between the conductor line and power reception circuit of the power receiver. Here, a matching circuit may be appropriately attached to the resonant network. The resonant network includes, for example, one or more pairs of capacitors connected in series to an LC parallel resonator.

The present disclosure can broaden the band of the power transmitter and receiver while maintaining the conductor line dimensions and the radiation efficiency of the power transmitter and receiver. As another application, the present disclosure can reduce the conductor line dimensions of the power transmitter and receiver while maintaining the band and the radiation efficiency of the power transmitter and receiver.

DETAILED DESCRIPTION

Embodiments of the present disclosure are described in detail below with reference to the drawings. The wireless power transfer system of the present disclosure is not limited to the following embodiments, and various modifications and changes may be made without departing from the gist of the present disclosure.

Herein, the terms representing the relationship between elements (e.g., "vertical", "parallel", and "perpendicular") and terms representing shapes of the elements are expressions that not only refer to exact meanings but also connote substantially equivalent ranges, e.g., a range with a difference of a few percentage points.

Entire Configuration of Wireless Power Transfer System

Figure 1:
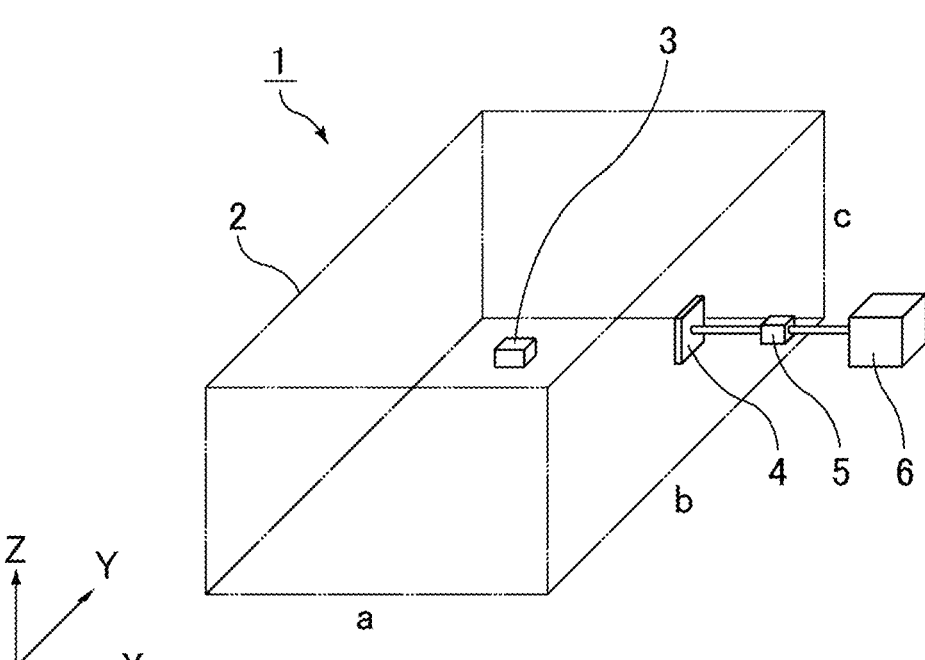
FIG. 1 is a diagram of an example wireless power transfer system according to an embodiment of the present disclosure.

FIG. 1 is a diagram of an example wireless power transfer system according to an embodiment of the present disclosure. In FIG. 1, a wireless power transfer system 1 utilizes as a resonator a structure entirely surrounded by an electromagnetic wave shielding member 2 having appropriate electrical conductivity. The wireless power transfer system 1 includes at least one power reception unit 3 and at least one power transmission unit 4 inside thereof, and also includes a resonant network 5 on one or each of the power transmission unit 4 and the power reception unit 3. For example, when the resonant network 5 is attached to the power transmission unit 4, it is placed between the power transmission unit 4 and a power transmission circuit 6. In other words, the wireless power transfer system 1 refers to the entire system to achieve wireless power transfer. The shape of the cavity resonator made of the electromagnetic wave shielding member 2 is not limited to a cuboidal shape.

The electromagnetic wave shielding member 2 may be any electrically conductive material. Preferred examples include metal materials such as copper, aluminum, iron, stainless steel, and nickel. Preferred examples also include conductive oxide materials such as zinc oxide, titanium oxide, and indium tin oxide (ITO); graphite; and organic conductive materials. The electromagnetic wave shielding member 2 may have a multilayered structure made of these materials mentioned above. Alternatively, any conductive alloy or mixture may be used. In addition, the electromagnetic wave shielding member 2 may be in any shape such as a plate form, a mesh form, a film form, or a porous form as long as it works as an electromagnetic wave shielding member at a frequency at which power is supplied. It suffices as long as the electromagnetic wave shielding member 2 has an electromagnetic wave shielding function only relative to the frequency used for wireless power transfer. For example, the electromagnetic wave shielding member 2 may allow electromagnetic waves at the frequency for wireless communication to pass therethrough. In other words, it suffices as long as the electromagnetic wave shielding member 2 has appropriate frequency selectivity. The electromagnetic wave shielding member 2 may be covered with a member, such as a resin, that allows electromagnetic waves to easily pass therethrough.

Figure 2:
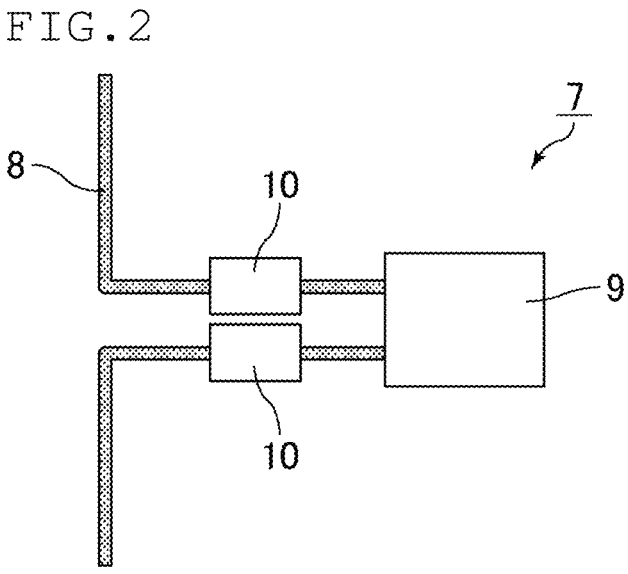
FIG. 2 is a schematic view of an example configuration of a power receiver in a power reception unit.

The power reception unit 3 includes the power receiver 7. An example configuration of the power receiver 7 is described with reference to FIG. 2. For example, the power receiver 7 includes a conductor line 8 that receives electromagnetic waves and a power reception circuit 9 including a rectifier circuit. A switch, a matching circuit, and the like may be attached to the power receiver 7 as needed. When the present disclosure is applied to the power reception unit 3, a resonant network 10 is attached between the conductor line 8 and the power reception circuit 9. Typically, a dipole conductor, a monopole conductor, a patch conductor, or the like is suitable as the conductor line 8. The conductor line 8 may be bent as appropriate. Alternatively, an inverted-F antenna may be employed in which the line is partially short-circuited at the ground or at a part that serves as a reference potential of the power reception unit 3. The corresponding frequency can be adjusted by inserting a capacitor or an inductor into a portion of the conductor line 8. Such a capacitor or an inductor can be suitably selected according to the resonance frequency from the cavity resonator defined by the electromagnetic wave shielding member 2.

Figure 3A:
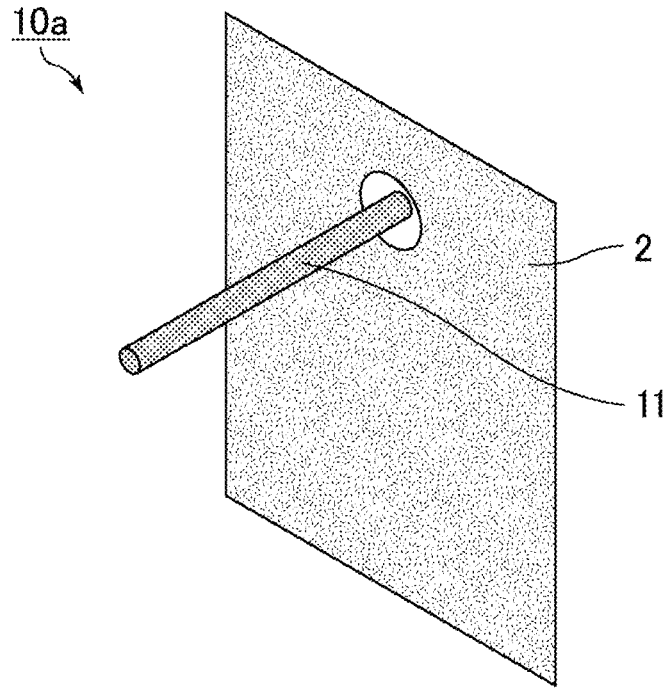
FIG. 3A is a schematic view of an example configuration of a power transmitter in a power transmission unit.
Figures 3B, 4:
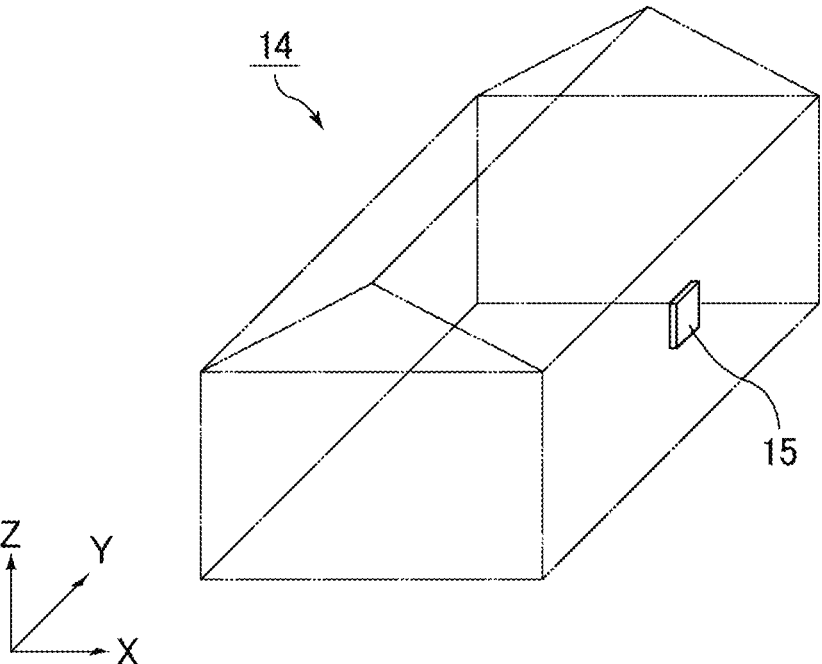
FIG. 3B is a schematic view of another example configuration of the power transmitter in the power transmission unit.
FIG. 4 is a schematic view of the relationship of a cavity resonator versus a power transmission unit according to a Reference Example of the present disclosure.

The power transmission unit 4 includes the power transmitter 10a. An example configuration of the power transmitter 10a is described with reference to FIG. 3A and FIG. 3B. As shown in FIG. 3A and FIG. 3B, the power transmitter 10a includes a conductor line 11. For example, the conductor line 11 may be made of a metal bar as shown in FIG. 3A, or may be made by attaching a printed circuit board wire 13 to a dielectric substrate 12 as shown in FIG. 3B. Preferably, the conductor line 11 is placed substantially vertically to the electromagnetic wave shielding member 2. Here, the conductor line 11 is placed in non-electric contact with the electromagnetic wave shielding member 2. In the present disclosure, a connector such as a sub-miniature type A (SMA) terminal may be used as appropriate to connect the conductor line 11 to the resonant network 5 or the power transmission circuit.

Here, the frequency of electromagnetic waves used in the wireless power transfer system 1 shown in FIG. 1 is examined. The resonance frequency $f_r$ can be determined by the following Equation 1 when the length of the cavity resonator in the horizontal direction is represented by "a" (X-axis direction) and "b" (Y-axis direction), and the length of the cavity resonator in the vertical direction is represented by "c" (Z-axis direction).

$$f_r = \frac{v}{\left(2\pi \times (\mu_r \times \varepsilon_r)^{\frac{1}{2}}\right)} \times \left\{\left(\frac{m\pi}{a}\right)^2 + \left(\frac{n\pi}{b}\right)^2 + \left(\frac{p\pi}{c}\right)^2\right\}^{\frac{1}{2}} \quad \text{[Equation 1]}$$

In the Equation, v is the speed of light; $\mu_r$ is the relative magnetic permeability; $\varepsilon_r$ is the relative permittivity; and m, n, and p are integers.

For example, when an object other than air is inside the cavity resonator, the average relative magnetic permeability and the average relative permittivity of the space change to $\mu_r{}'$ and $\varepsilon_r{}'$, respectively. Accordingly, the resonance frequency is shifted to $f_r{}'$. Here, $f_r{}'$ is expressed by the following Equation 2.

$$f_r' = \frac{v}{\left(2\pi \times (\mu_r' \times \varepsilon_r')^{\frac{1}{2}}\right)} \times \left\{\left(\frac{m\pi}{a}\right)^2 + \left(\frac{n\pi}{b}\right)^2 + \left(\frac{p\pi}{c}\right)^2\right\}^{\frac{1}{2}} \quad \text{[Equation 2]}$$

In the assumed case of a system that wirelessly transfer power to ITO devices in an actual-use environment by utilizing a space such as a factory or warehouse as a cavity resonator, the IOT devices and other objects in the cavity resonator are not always arranged in a constant pattern. In other words, the resonance frequency $f_r$ derived from Equation 1 is different from the resonance frequency $f_r{}'$ derived from Equation 2. This requires that the power transmitter and receiver be designed to be capable of responding to some frequency changes, instead of being designed based on only one resonance frequency of choice. In other words, it is necessary to broaden the band for power transmission and reception.

In the wireless power transfer system 1 according to the embodiment of the present disclosure, the conductor line 8 of the power receiver 7 is, for example, open-ended at one end, and the product of the phase constant β and the conductor line length L is smaller than π/2. In this case, the conductor line 8 functions as a capacitive open stub. Then, the cavity resonator is coupled to the power reception unit 3 via the capacitance brought by the conductor line 8.

Similarly, in the wireless power transfer system 1 according to the embodiment of the present disclosure, the conductor line 11 of the power transmitter 10a is, for example, open-ended at one end, and the product of the phase constant β and the conductor line length L is smaller than π/2. In this case, the conductor line 11 functions as a capacitive open stub. Then, the cavity resonator is coupled to the power transmission unit 4 via the capacitance brought by the conductor line 11.

In other words, wireless power transfer from the power transmission unit 4 to the power reception unit 3 can be performed by capacitive coupling between the cavity resonator and the power reception unit 3 and capacitive coupling between the cavity resonator and the power transmission unit 4. As a result of extensive studies, the present inventors clarified the relationship of the conductor line length L versus the coupling capacitance. This relationship is described in the Reference Example below.

EXAMPLES

Examples that more specifically disclose the configuration and effect of the present disclosure are described below. The present disclosure is not limited to these examples.

Reference Example

In a Reference Example, the relationship of the conductor line length L versus the coupling capacitance is clarified, and the relationship between the structure of the present disclosure and its effect is described.

FIG. 4 is a schematic view of the relationship of the cavity resonator 14 versus the power transmission unit 15 according to a Reference Example of the present disclosure.

Figure 5A:
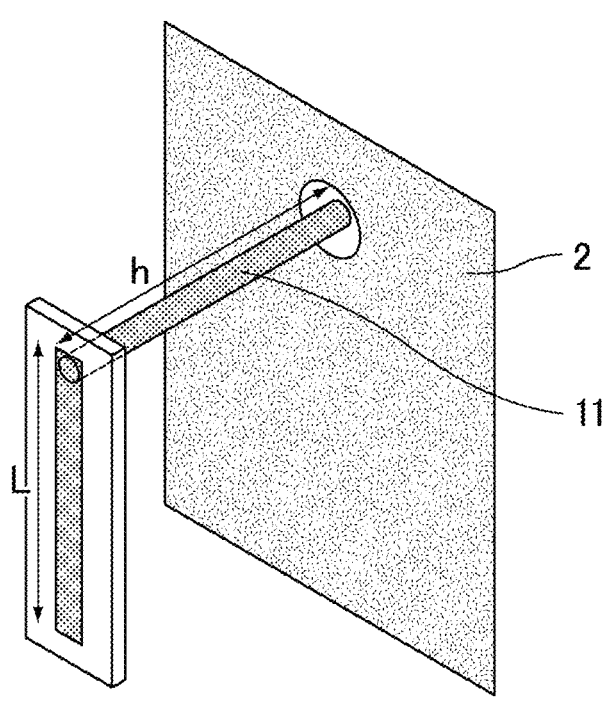
FIG. 5A is a schematic view of the power transmission unit including a conductor line having a linear shape according to the Reference Example of the present disclosure.
Figure 5B:
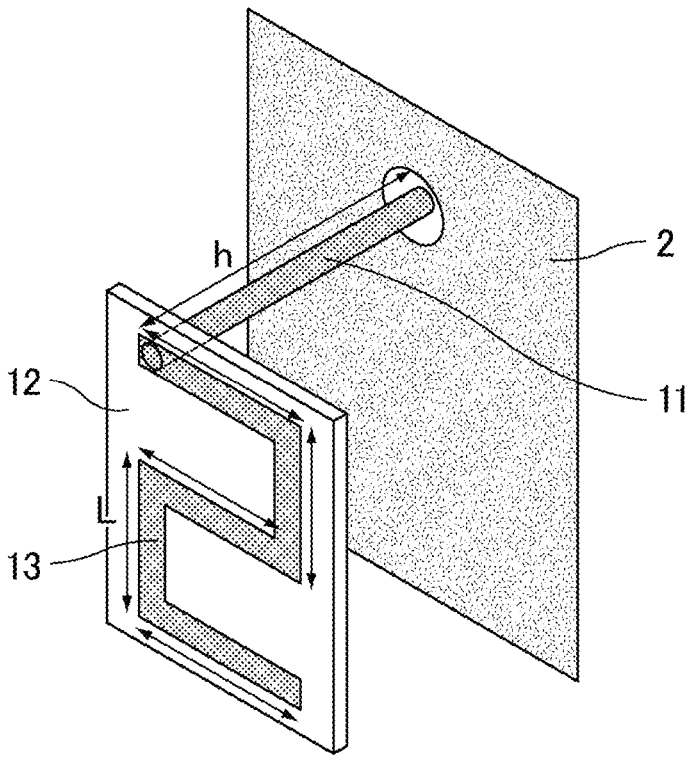
FIG. 5B is a schematic view of the power transmission unit including a conductor line having a bent shape according to the Reference Example of the present disclosure.

In the Reference Example, an examination is made on the cavity resonator 14 shown in FIG. 4 which includes the power transmission unit 15 shown in FIG. 5A or FIG. 5B, and the electromagnetic wave shielding member 2 including an aluminum frame, a zinc mesh wall, and an aluminum floor.

The cavity resonator 14 has a shape with a gable roof. The length "a" in the X-axis direction is 1500 mm, and the length "b" in the Y-axis direction is 1800 mm. The height of a vertical wall portion is 1500 mm. The height including the gable roof is 1960 mm. The power transmitter of the transmission unit 15 is placed on the YZ plane.

The power transmission unit 15 is one in which a printed board with a conductor line having a linear shape is attached to an end of a Cu rod having a diameter of 1 mm as shown in FIG. 5A, or one in which a printed board with a conductor line having a bent shape is attached to an end of a Cu rod having a diameter of 1 mm as shown in FIG. 5B. In FIG. 5A and FIG. 5B, "h" represents the distance from the cavity resonator to a portion where the printed board is connected, and is set to 50 mm. The "L" represents the total length of the conductor line.

7

Figures 6A, 6B:
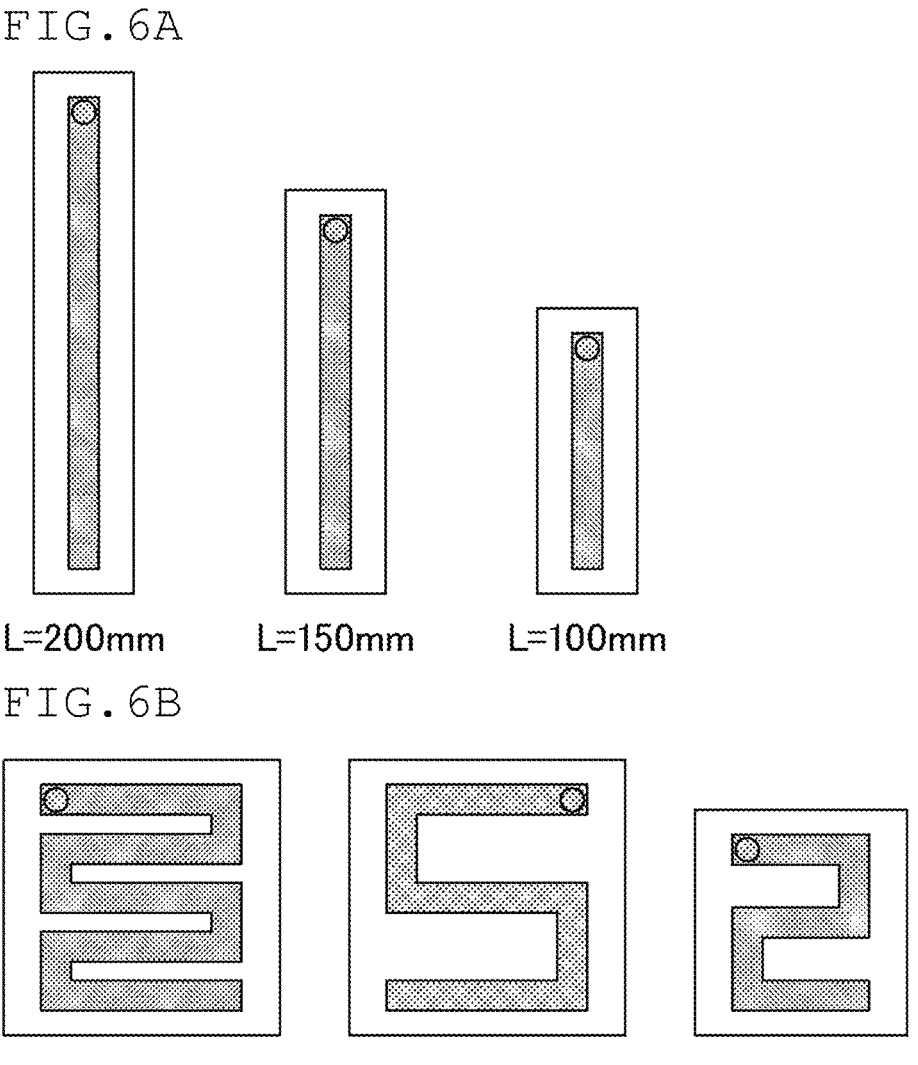
FIG. 6A is a schematic view of shapes each corresponding to the linear shape shown in FIG. 5A.
FIG. 6B is a schematic view of shapes each corresponding to the bent shape shown in FIG. 5B.

In the Reference Example, the conductor line length L may be 100, 150, 200, 385, or 600 mm. FIG. 6A shows shapes each corresponding to the linear shape (also described as "L-shape") shown in FIG. 5A. FIG. 6B shows shapes each corresponding to the bent shape (also described as "S-shape") shown in FIG. 5B.

Figure 7A:
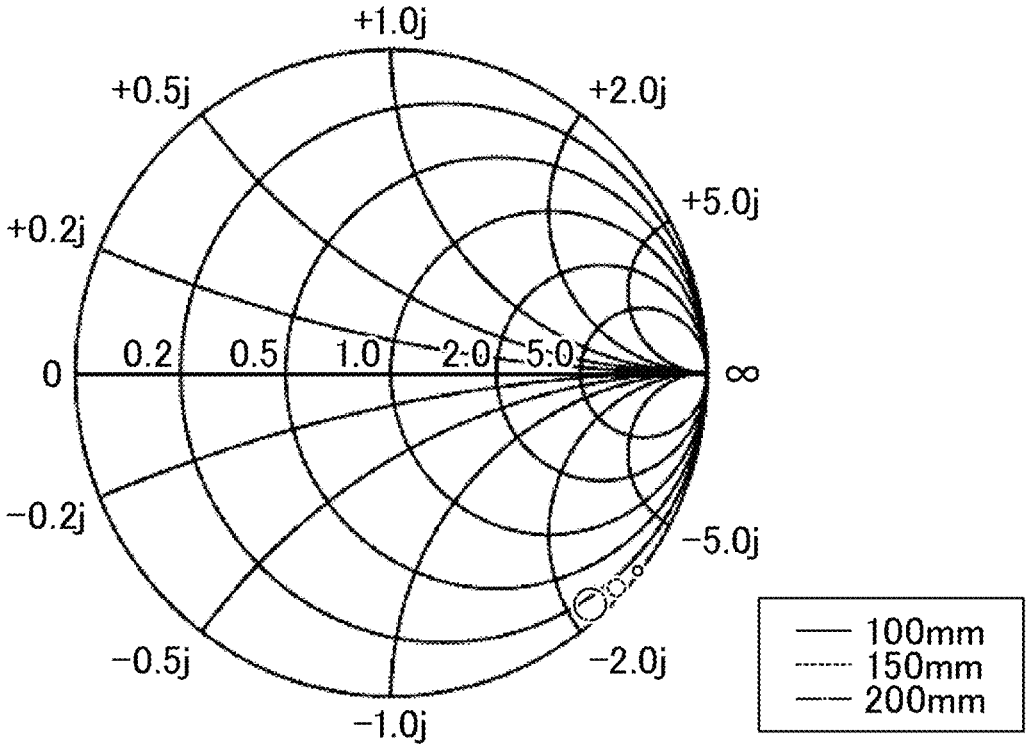
FIG. 7A is a S11 Smith chart obtained from the linear shapes shown in FIG. 6A.
Figure 7B:
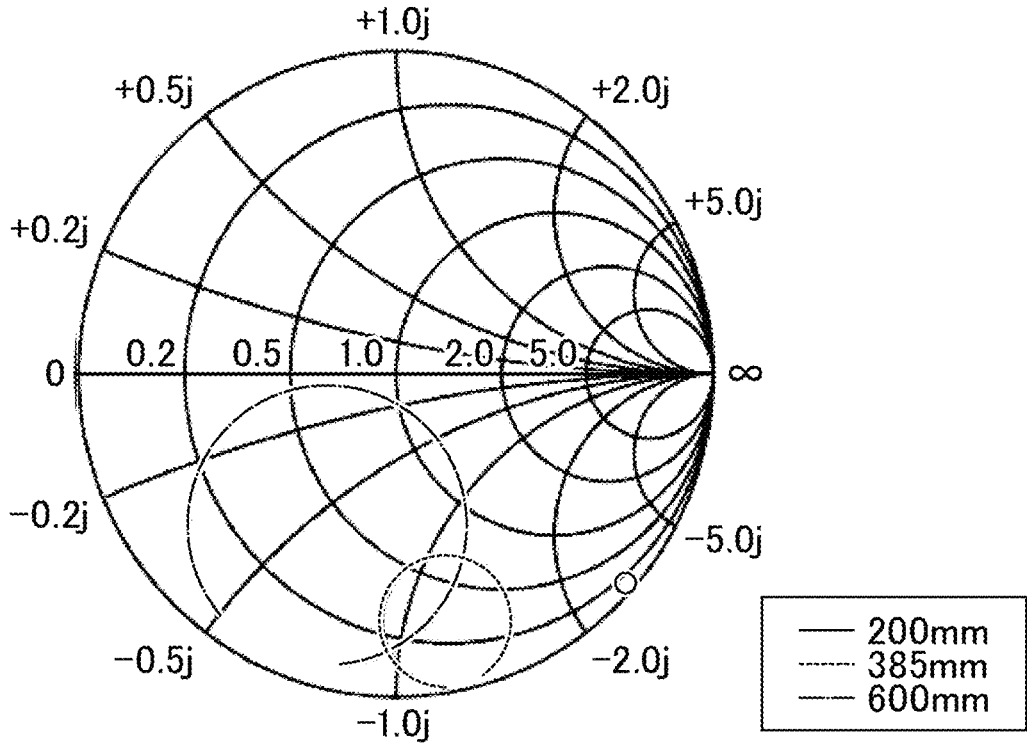
FIG. 7B is a S11 Smith chart obtained from the bent shapes shown in FIG. 6B.

FIG. 7A and FIG. 7B each show a S11 Smith chart obtained by measuring the conductor line length L while changing the length L as appropriate using any of the linear shapes shown in FIG. 6A and any of the bent shape shown in FIG. 6B.

Figure 8:
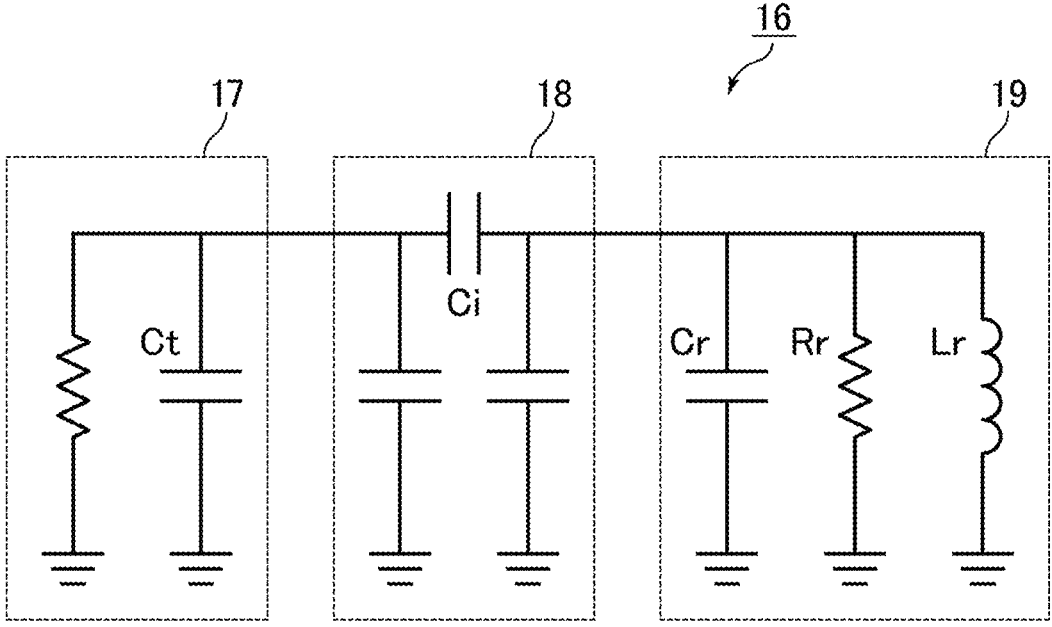
FIG. 8 shows an equivalent circuit including a power transmission unit, a J inverter, and a cavity resonator.

Here, the equivalent circuit 16 is shown in FIG. 8 in order to derive capacitance that allows capacitive coupling. The equivalent circuit 16 includes the power transmission unit 17, the J inverter 18, and the cavity resonator 19. The power transmission unit 17 and the cavity resonator 19 are coupled to each other via the capacitance Ci of the J inverter 18.

The Smith charts shown in FIG. 7A and FIG. 7B were fitted with the equivalent circuit 16 shown in FIG. 8, whereby the equivalent capacity Cr, equivalent inductance Lr, equivalent resistance Rr of the cavity resonator 19, the equivalent capacity Ct of the power transmission unit 17, and the coupling capacitance Ci of the J inverter 18 were calculated.

Advanced Design Systems available from Keysight was used for fitting.

As described above, the equivalent capacity Cr and the equivalent inductance Lr of the cavity resonator 19 with a conductor line length L of 100 to 600 mm was calculated. The results found that the equivalent capacity Cr was 19.884 to 20.575 pF and the equivalent inductance Lr was 86.927 to 89.949 nH. In other words, the results show that the equivalent capacity Cr and the equivalent inductance Lr of the cavity resonator 19 are substantially constant regardless of the conductor line length L.

Figure 9:
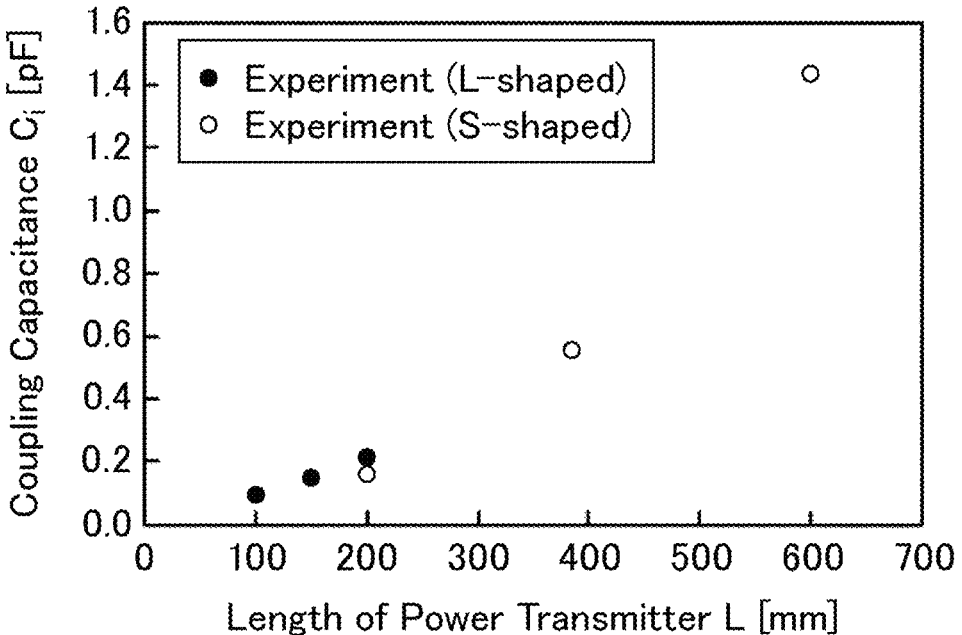
FIG. 9 is a graph showing the coupling capacitance obtained by fitting the Smith charts shown in FIG. 7A and FIG. 7B with the equivalent circuit shown in FIG. 8.

FIG. 9 is a graph showing the coupling capacitance Ci obtained by fitting the Smith charts shown in FIG. 7A and FIG. 7B with the equivalent circuit 16 shown in FIG. 8. The resulting relationship can be approximated by Equation 3.

[Equation 3]

$$Ci = \left(4.83366 \times 10^{-18}\right) \times L^2 - \left(7.44057 \times 10^{-16}\right) \times L + \left(1.38054 \times 10^{-13}\right) \quad \text{(F)}$$

The discussion so far has clarified the relationship of the conductor line length L versus the coupling capacitance Ci between the cavity resonator and the conductor line when the structure of the present disclosure is not used. In the equivalent circuit 16, the circuit connected to the cavity resonator 19 via the J inverter 18 is used as the power transmission unit 17. Even when the circuit is used as a power reception unit, the same equivalent circuit is obtained. In other words, the discussion applies to both power transmission and reception.

Figure 10:
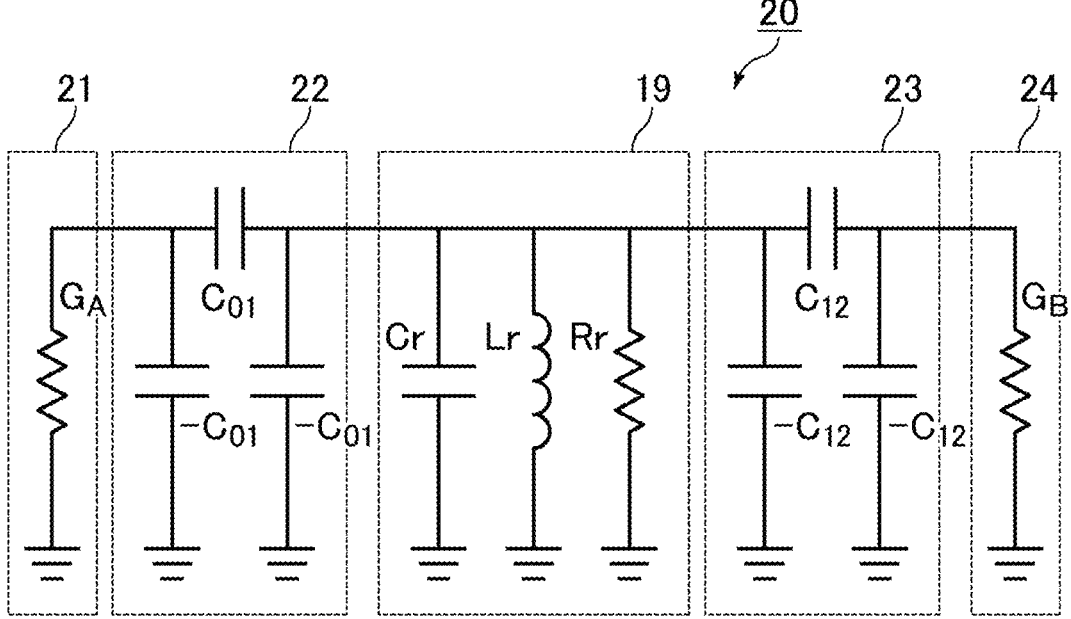
FIG. 10 is an equivalent circuit including a power transmission circuit, a first J inverter, the cavity resonator, a second J inverter, and a power reception circuit.

Next, the equivalent circuit is expanded by adding a power reception unit as shown in FIG. 10 to provide the equivalent circuit 20. The equivalent circuit 20 includes the power transmission circuit 21, the first J inverter 22, the cavity resonator 19, the second J inverter 23, and the power reception circuit 24. Here, the power transmission circuit 21 and the cavity resonator 19 are coupled to each other via the coupling capacitance $C_{01}$ of the first J inverter 22. The cavity resonator 19 and the power reception circuit 24 are coupled to each other via the coupling capacitance $C_{12}$ of the second J inverter 23.

That wireless power transfer allows power to be passed with a certain band can be rephrased as that the equivalent circuit 20 functions as a bandpass filter having an adequate bandwidth (pass bandwidth). In other words, the design theory for the bandpass filter is applicable.

In order to approximate the resonator by a lumped constant circuit element, the characteristics around the resonance frequency are approximated using a susceptance slope parameter b represented by Equation 4. In the Equation, $\omega$ is the frequency, B is the susceptance, C is the capacitance, and L is the inductance. The capacitance and the inductance represent a resonator.

$$b = \frac{\omega_0}{2} \frac{dB}{d\omega}\bigg|_{\omega=\omega_0} = \frac{\omega_0}{2} \frac{d}{d\omega}\left(\omega C - \frac{1}{\omega L}\right)\bigg|_{\omega=\omega_0} = \omega_0 C \qquad \text{[Equation 4]}$$

The coupling capacitance C of the J inverter can be represented by Equations 5 to 9, using the following values: passband ripple $L_{AR}$ of bandpass filter expressed in decibels; susceptance slope parameter b; input terminal conductance G; fractional bandwidth w representing the ratio of passband center frequency to passband width; resonance frequency $\omega'$ of prototype filter; the number n of resonators (number of bandpass filter stages); and g parameters.

$$\beta = \ln\left(\coth\frac{L_{AR}}{17.37}\right) \qquad \text{[Equations 5]}$$

$$\gamma = \sinh\left(\frac{\beta}{2n}\right)$$

$$a_k = \sin\left|\frac{(2k-1)\pi}{2n}\right|, k = 1,2,\ldots,n \qquad \text{[Equations 6]}$$

$$b_k = \gamma^2 + \sin^2\left(\frac{k\pi}{n}\right), k = 1,2,\ldots,n$$

Input stage $$g_0 = 1 \qquad \text{[Equation 7]}$$

$$g_1 = \frac{2a_1}{\gamma}$$

Interstage $$g_k = \frac{4a_{k-1}a_k}{b_{k-1}g_{k-1}}$$

Output stage $$g_{n+1} = \begin{cases} 1 & (n: \text{Odd number}) \\ \coth^2\left(\frac{\beta}{4}\right) & (n: \text{Even number}) \end{cases}$$

Input stage $$J_{01} = \sqrt{\frac{G_A b_1 w}{g_0 g_1 \omega'_1}} \qquad \text{[Equations 8]}$$

Interstage $$J_{x,x+1} = \frac{w}{\omega'_1}\sqrt{\frac{b_x b_{x+1}}{g_x g_{x+1}}} \quad (x = 1,2 \ldots n-1)$$

Output stage $$J_{n,n+1} = \sqrt{\frac{G_B b_n w}{g_n g_{n+1}\omega'_1}}$$

-continued

Input stage $$C_{01} = \frac{J_{01}}{\omega_0 \sqrt{1 - (J_{01}/G_A)^2}}$$  [Equations 9]

Interstage $$C_{x,x} = \frac{j_{x,x+1}}{\omega_0}$$

Output stage $$C_{n,n+1} = \frac{J_{n,n+1}}{\omega_0 \sqrt{1 - (J_{n,n+1}/G_B)^2}}$$

The susceptance slope of the cavity resonator is determined from Equation 4. Then, a desired transfer efficiency $\eta$, a desired fractional bandwidth w, and an input/output conductance $G_A$ or $G_B$ are set, and the coupling capacitance is substituted into the relational expressions in Equations 4 to 9, whereby the coupling capacities $C_{01}$ and $C_{12}$ between the cavity resonator and the power transmitter and receiver can be calculated. Then, the conductor line length L that satisfies the coupling capacities $C_{01}$ and $C_{12}$ can be determined from the relationship represented by Equation 3. Here, the transfer efficiency $\eta$ (%) is expressed by the following Equation.

$$\eta = \left(1 - 10^{-\frac{L_{AR}}{10}}\right) \times 100$$  [Equation 10]

Figure 11:
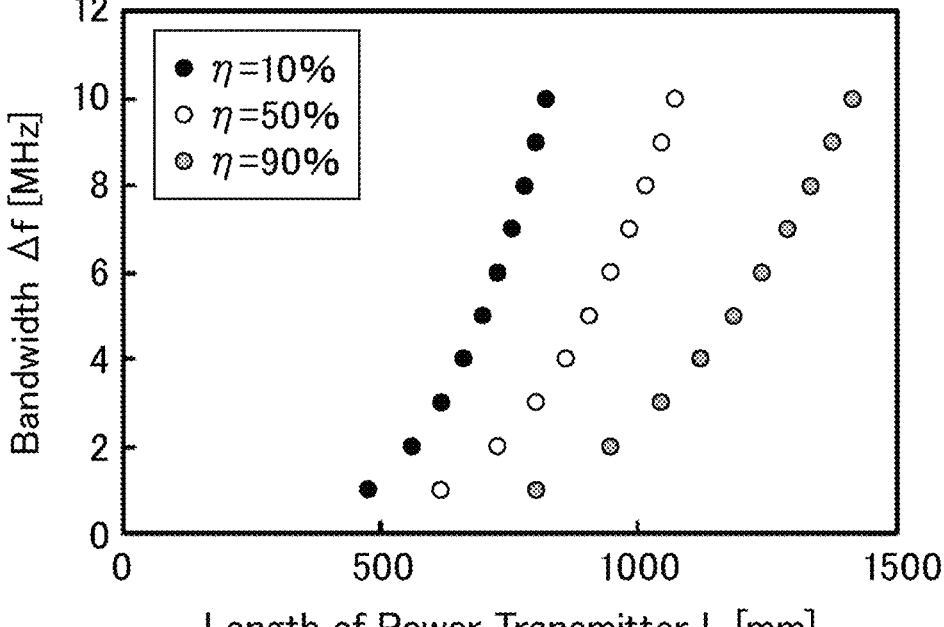
FIG. 11 is a graph showing the relationship of conductor line length versus frequency bandwidth within which power can be transmitted with an efficiency equal to or higher than the target efficiency as calculated using Equations 3 to 9.

FIG. 11 is a graph showing the relationship of conductor line length L versus frequency bandwidth $\Delta f$ in which power can be transmitted with an efficiency equal to or higher than the target efficiency as calculated using Equations 3 to 9. Here, the conductance G is set to 0.02 S, and the transfer efficiency $\eta$ is set to 90%, 50%, or 10%. FIG. 11 shows that the conductor line length L needs to be 1240 mm in order to achieve power transmission and reception with a transfer efficiency $\eta$ of 90% and a bandwidth of 6 MHz, for example. It is clear from FIG. 11 that there is no choice but to reduce the transfer efficiency $\eta$ in order to increase the bandwidth $\Delta f$ while maintaining conductor line length L, for example. It is also clear that there is no choice but to increase the conductor line length L in order to increase the bandwidth $\Delta f$ while maintaining the transfer efficiency $\eta$.

It is clear as described above that in the case of wireless power transfer that uses a traditional cavity resonator, there is no choice but to employ a method that is unacceptable from a practical point of view, such as reducing the transfer efficiency or increasing the conductor line length, in order to obtain a practical band.

Examples

The equivalent circuit 20 shown in FIG. 10 simulating a traditional system is a bandpass filter including a resonator (n=1 stage) consisting of a cavity resonator. This means that the coupling between the power transmitter and the cavity resonator corresponds to the input stage with n=1 in Equations 7 to 9 and that the coupling between the cavity resonator and the power receiver corresponds to the output stage with n=1 in Equations 7 to 9.

Figure 12:
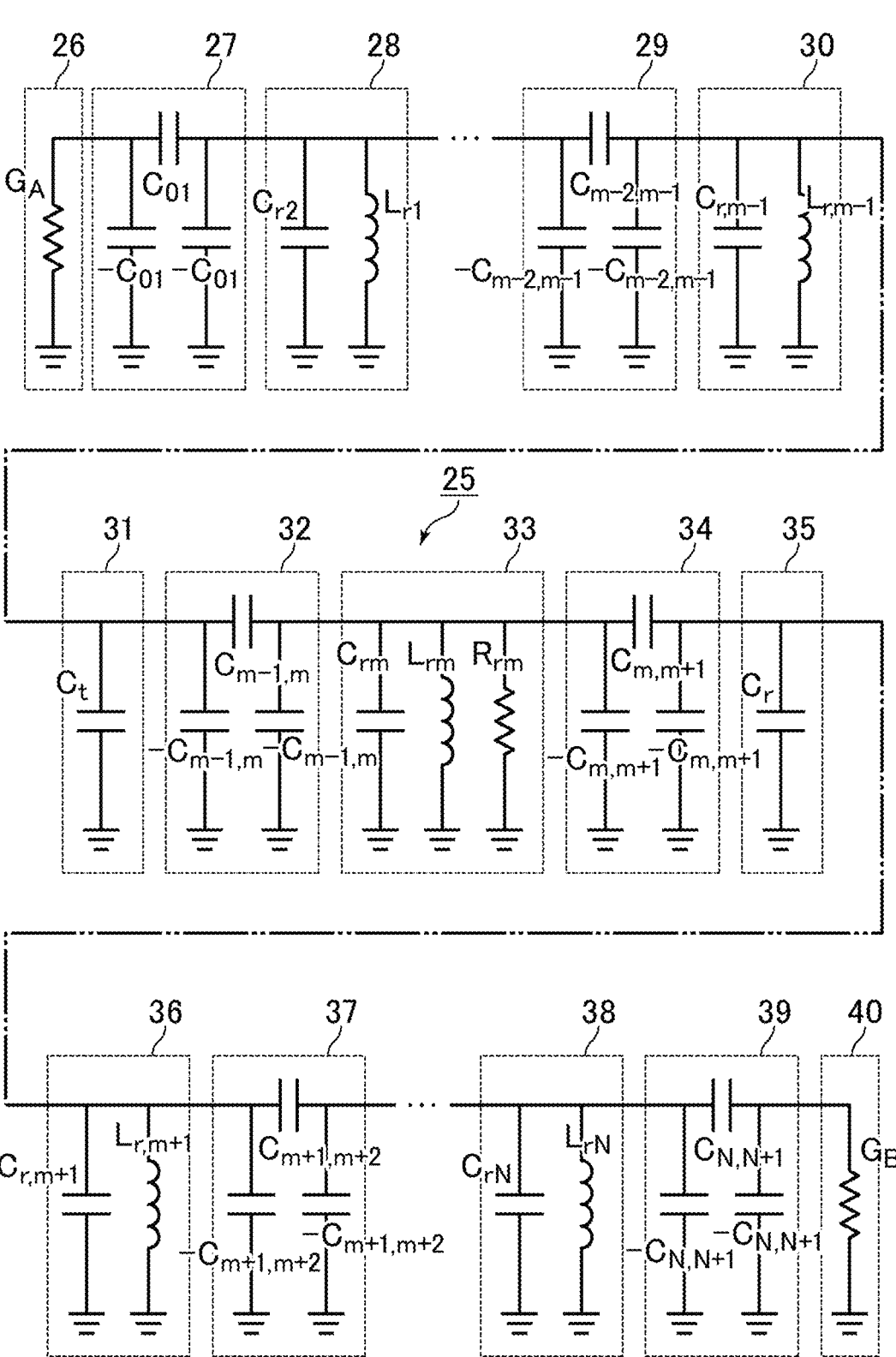
FIG. 12 shows an equivalent circuit of the wireless power transfer system according to an embodiment of the present disclosure.

In contrast, in the equivalent circuit 25 of the bandpass filter to which a resonant network different from the cavity resonator was added as shown in FIG. 12, the capacitive coupling for wireless power transmission and reception corresponds to the interstage coupling in Equations 7 to 9. In other words, adding a resonant network makes it possible to convert the capacitance for coupling into a different Equation.

FIG. 12 shows the equivalent circuit 25 of the wireless power transfer system according to the embodiment of the present disclosure. The equivalent circuit 25 includes a power transmission circuit 26, a first J inverter 27, a first resonant network 28, an $(m-1)^{th}$ J inverter 29, an $(m-1)^{th}$ resonator 30, a power transmitter equivalent capacity 31, an $m^{th}$ J inverter 32, an $m^{th}$ resonator (cavity resonator) 33, an $(m+1)^{th}$ J inverter 34, a power receiver equivalent capacity 35, an $(m+1)^{th}$ resonant network 36, an $(m+1)^{th}$ J inverter 37, an $N^{th}$ resonator 38, an $N^{th}$ J inverter 39, and a power reception circuit 40. Here, m<N and N≥2. The "N=2" refers to the case where the power transmission circuit 26 or the power reception circuit 40 is provided with an equivalent circuit resonant network on. In the present embodiment, the resonators excluding the cavity resonator 33 are LC parallel resonators.

As shown in FIG. 12, when the cavity resonator 33 is an $m^{th}$ resonator counted from the power transmitter side, shunt elements between the power transmission circuit 26 and an $(m+1)^{th}$ resonator are grounded to the cavity resonator 33, and shunt elements in a region from the $(m+1)^{th}$ resonator to the power reception circuit 40 are connected to the ground of the power receiver defining the power reception unit.

Conversion from the equivalent circuit 20 into the equivalent circuit 25 means that the J inverter coupling corresponding to the input/output coupling between the conductor line of the power transmitter and receiver and the cavity resonator is changed from the input/output stage model to an interstage coupling model in Equations 7 to 9. Application of such conversion makes it possible to reduce the coupling capacitance while maintaining a similar band and an equivalent transfer efficiency. This is equivalent to shortening of the conductor line length. Alternatively, the band can be broadened while maintaining the transfer efficiency and the coupling capacitance (in other words, while maintaining the conductor line length).

Thus, the use of the circuit structure of the present disclosure makes it possible to reduce the coupling capacitance while maintaining an equivalent band and an equivalent transfer efficiency. In other words, a system can be provided in which the conductor line length can be shortened while maintaining the performance.

The circuit structure of the present disclosure can provide a different function which makes it possible to broaden the band while maintaining the transfer efficiency and the coupling capacitance. This means that a system can be provided in which the band can be broadened while maintaining the conductor line length.

In the present disclosure, preferably, the wireless power transfer system includes one or more resonators between the cavity resonator and the power reception circuit, and also includes one or more resonators between the cavity resonator and the power transmission circuit, thus satisfying N≥3. Here, the number N of resonators is preferably as large as possible within a tolerance range of loss resulting from the circuit board footprint and an LC component to be mounted. Realistically, less than eight is more preferred. For example, when the number N of resonators is 7, three resonators are disposed adjacent to the power transmitter, and three resonators are disposed adjacent to the power receiver. Thus, there may be seven resonators in total, including one cavity resonator.

Figure 13:
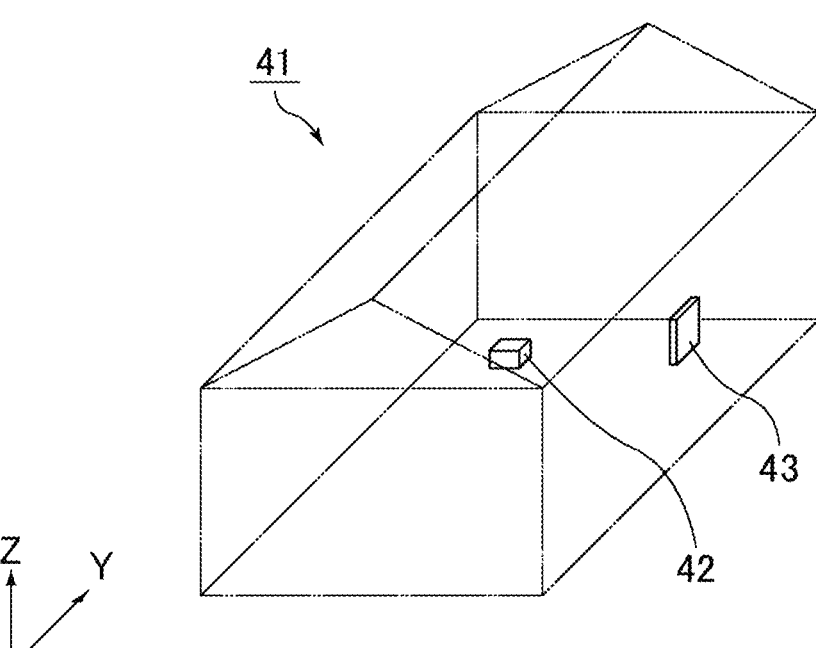
FIG. 13 is a schematic view of a wireless power transfer system according to an Example of the present disclosure.

FIG. 13 is a schematic view of the wireless power transfer system 41 according to an Example of the present disclosure.

In this Example, an examination is made on the wireless power transfer system 41 which includes a power reception unit 42 including a conductor line and a resonant network, a power transmission unit 43 including a conductor line and a resonant network, and a cavity resonator which includes the electromagnetic wave shielding member 2 including an aluminum frame, a zinc mesh wall, and an aluminum floor.

Figure 14:
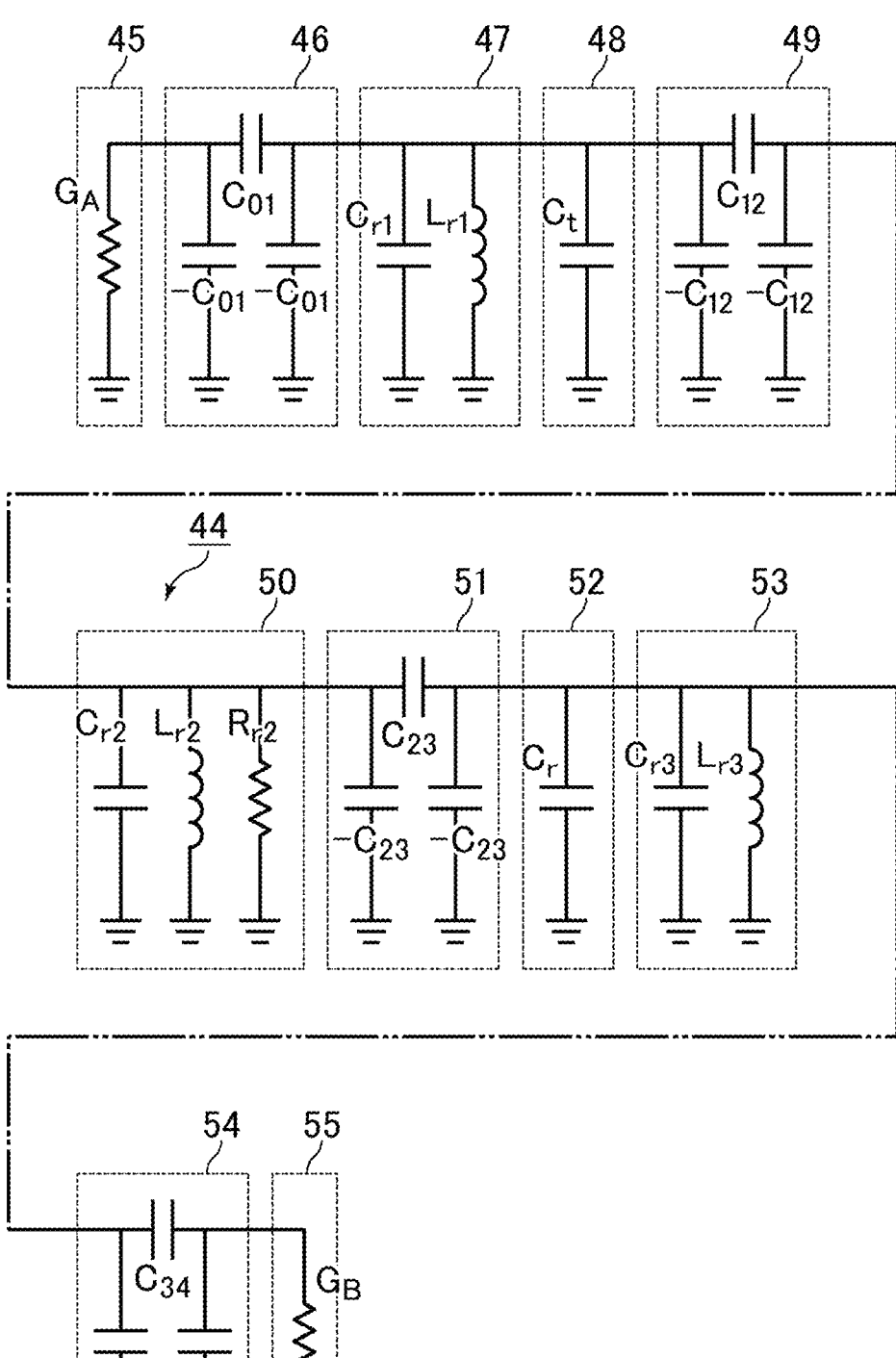
FIG. 14 is an equivalent circuit of the Example.

In this Example, a comparison is made against Comparative Example. The equivalent circuit 20 of Comparative Example is as shown in FIG. 10. It is in the form of a bandpass filter including a resonator (n=1 stage) consisting of a cavity resonator. The equivalent circuit 44 of this Example is as shown in FIG. 14. It is in the form of a bandpass filter including resonators (n=3 stages) including two resonant networks and a cavity resonator between the resonant networks.

The equivalent circuit 44 of this Example includes a power transmission circuit 45, a first J inverter 46, a first resonant network 47, a power transmitter equivalent capacity 48, a second J inverter 49, a second resonant network (cavity resonator) 50, a third J inverter 51, a power receiver equivalent capacity 52, a third resonant network 53, a fourth J inverter 54, and a power reception circuit 55.

As is clear from the examination in the Reference Example, the equivalent circuit 20 in Comparative Example has the following values: $C_r$=20.570 pF, $L_r$=86.927 nH, and $R_r$=49.291 kΩ. The element values optimized to achieve power transmission and reception with an efficiency of 90% and a bandwidth of 6 MHz using the equivalent circuit 20 were as follows: $G_A$=0.02 S, $G_B$=0.02 S, $C_{01}$=6.64 pF, and $C_{12}$=6.64 pF.

The equivalent circuit 44 in this Example uses the same cavity resonator as in Comparative Example and thus has the following values: $C_{r2}$=20.570 pF, $L_{r2}$=86.927 nH, and $R_{r2}$=49.291 kΩ. Here, the element values optimized to achieve power transmission and reception with an efficiency of 90% and a bandwidth of 6 MHz were as follows: $G_A$=0.02S, $G_B$=0.02S, $C_{01}$=4.758 pF, $C_{12}$=0.861 pF, $C_{23}$=0.861 pF, $C_{34}$=4.758 pF, $C_{r1}+C_t$=20.570 pF, $C_{r3}+C_r$=20.570 pF, $L_{r1}$=86.927 nH, and $L_{r3}$=86.927 nH.

Figure 15:
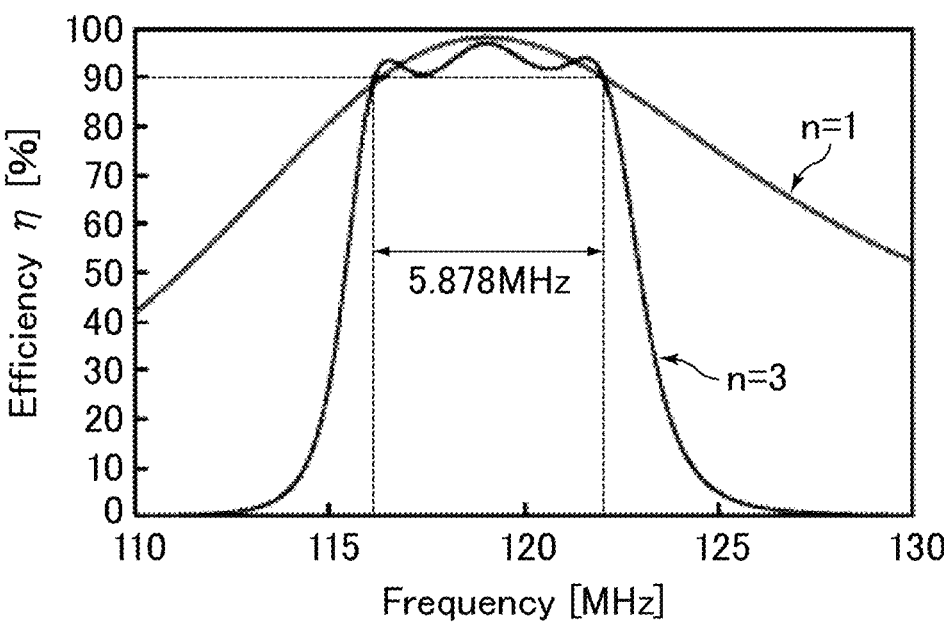
FIG. 15 is a graph showing frequency characteristics in Comparative Example and the Example.

FIG. 15 shows frequency characteristics obtained by importing the values of the equivalent circuits and the optimized values of the elements in Comparative Example and this Example into Keysight Advanced Design Systems. Clearly, both Comparative Example (n=1) and this Example (n=3) substantially achieved a transfer efficiency η of 90% and a bandwidth of about 6 MHz.

Figure 16:
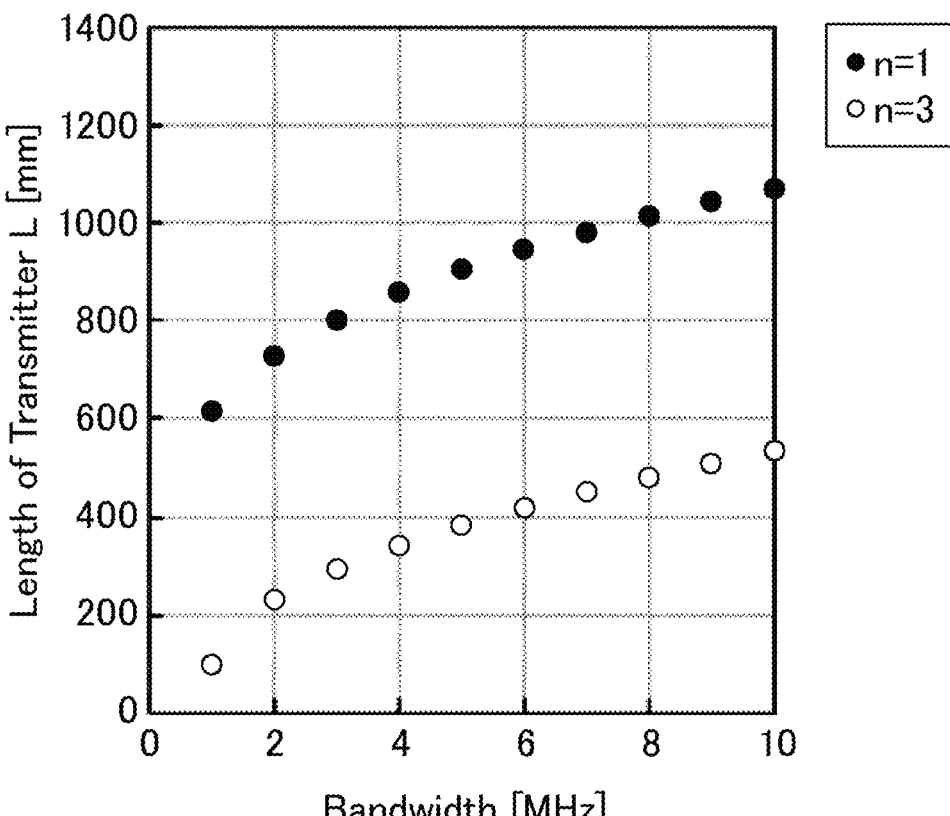
FIG. 16 is a graph showing the relationship of bandwidth versus conductor line length in Comparative Example and the Example.

Based on the experimental results, the conductor line length required to satisfy the target band while maintaining 90% transfer efficiency was calculated. FIG. 16 shows the calculation results. An Example (n=3) shows that the band for power transmission and reception can be broadened, compared to Comparative Example (n=1), although the conductor line length L is the same between this Example and Comparative Example. In this Example, the conductor line length L can be shortened while maintaining the band for power transmission and reception.

Figure 17:
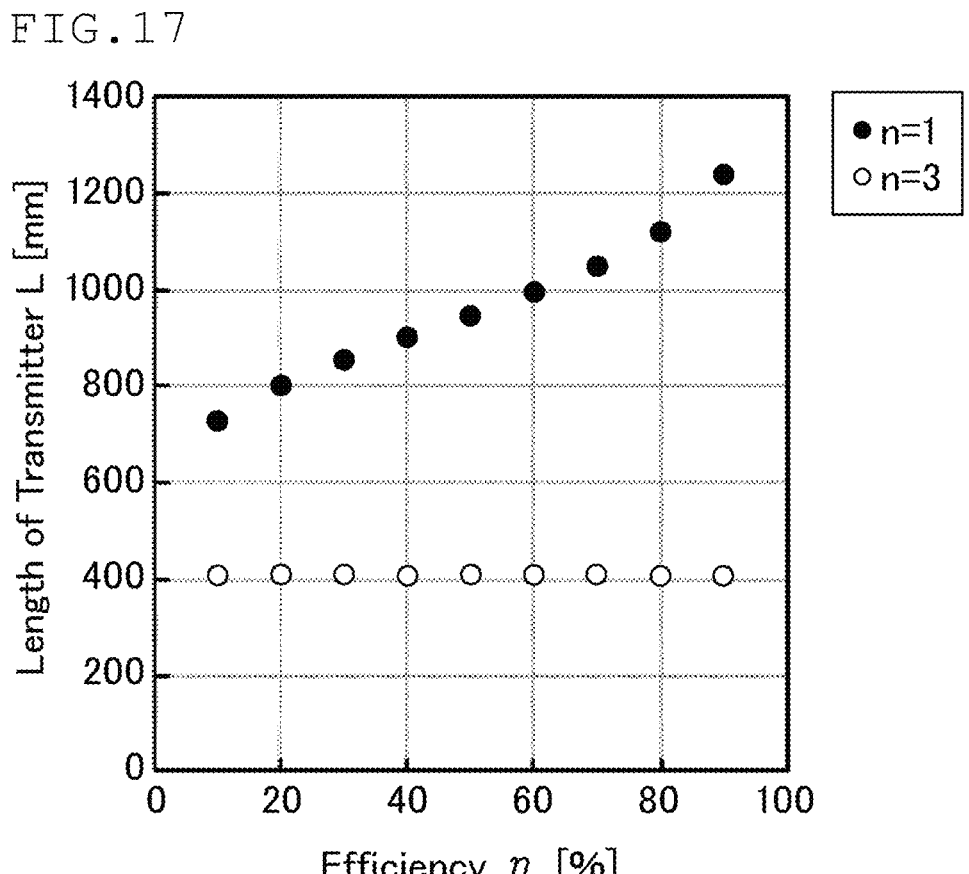
FIG. 17 is a graph showing the relationship of transfer efficiency versus conductor line length in Comparative Example and the Example.

Similarly, based on the experimental results, the conductor line length required to satisfy the target transfer efficiency while maintaining 6 MHz band for power transmission and reception was calculated. FIG. 17 shows the calculation results. An Example (n=3) shows that the transfer efficiency η can be increased, compared to Comparative Example (n=1), although the conductor line length L is the same between this Example and Comparative Example. In this Example, the conductor line length L can be shortened while maintaining the transfer efficiency η.

In the present disclosure, each LC parallel resonator defining the resonators excluding the cavity resonator may be configured such that its capacitance component is completely absorbed in the capacitance component of its adjacent J inverter. In this case, the resonators can be achieved using only inductors, which is more advantageous in terms of footprint.

In the present disclosure, the resonator attached to the power reception circuit may include a parallel resonant element represented by an inductor and a capacitor, and a balun (or a balanced-unbalanced conversion circuit).

The present disclosure has been described using J inverters and parallel resonators, but a similar effect can be achieved using K inverters and series resonators.

What is claimed is:

1. A wireless power transfer system comprising:
a cavity resonator entirely surrounded by an electromagnetic wave shield having appropriate conductivity and frequency selectivity;
at least one power receiver;
at least one power transmitter; and
at least one resonator,
wherein in an equivalent circuit of the wireless power transfer system from a power transmission circuit of the power transmitter to a power reception circuit of the power receiver, N (N≥2) resonators including the cavity resonator are connected in series via an inverter on a power transmission route from the power transmission circuit to the power reception circuit, and
the at least one resonator includes one or more resonators between the cavity resonator and the power transmission circuit.

2. A wireless power transfer system comprising:
a cavity resonator entirely surrounded by an electromagnetic wave shield having appropriate conductivity and frequency selectivity;
at least one power receiver;
at least one power transmitter; and
at least one resonator,
wherein in an equivalent circuit of the wireless power transfer system from a power transmission circuit of the power transmitter to a power reception circuit of the power receiver, N (N≥2) resonators including the cavity resonator are connected in series via an inverter on a power transmission route from the power transmission circuit to the power reception circuit, and
the at least one resonator includes one or more resonators between the cavity resonator and the power reception circuit, and also includes one or more resonators between the cavity resonator and the power transmission circuit, thus satisfying N≥3.

3. The wireless power transfer system according to claim 1, wherein
the at least one resonator excluding the cavity resonator is an LC parallel resonator.

4. The wireless power transfer system according to claim 1, wherein
when the cavity resonator is an $m^{th}$ resonator counted from the power transmitter side, a shunt element between the power transmission circuit and an $(m+1)^{th}$ resonator is grounded to the cavity resonator, and a shunt element in a region from the $(m+1)^{th}$ resonator to the power reception circuit is connected to the ground of the power receiver.

5. The wireless power transfer system according to claim 1, wherein
a conductor line of the power receiver and a conductor line of the power transmitter are each open-ended at one end, and a product of a phase constant β and a conductor line length L is smaller than π/2.

6. The wireless power transfer system according to claim 2, wherein
the at least one resonator excluding the cavity resonator is an LC parallel resonator.

7. The wireless power transfer system according to claim 2, wherein
when the cavity resonator is an m$^{th}$ resonator counted from the power transmitter side, a shunt element between the power transmission circuit and an (m+1)$^{th}$ resonator is grounded to the cavity resonator, and a shunt element in a region from the (m+1)$^{th}$ resonator to the power reception circuit is connected to the ground of the power receiver.

8. The wireless power transfer system according to claim 3, wherein
when the cavity resonator is an m$^{th}$ resonator counted from the power transmitter side, a shunt element between the power transmission circuit and an (m+1)$^{th}$ resonator is grounded to the cavity resonator, and a shunt element in a region from the (m+1)$^{th}$ resonator to the power reception circuit is connected to the ground of the power receiver.

9. The wireless power transfer system according to claim 6, wherein
when the cavity resonator is an m$^{th}$ resonator counted from the power transmitter side, a shunt element between the power transmission circuit and an (m+1)$^{th}$ resonator is grounded to the cavity resonator, and a shunt element in a region from the (m+1)$^{th}$ resonator to the power reception circuit is connected to the ground of the power receiver.

10. The wireless power transfer system according to claim 2, wherein
a conductor line of the power receiver and a conductor line of the power transmitter are each open-ended at one end, and a product of a phase constant β and a conductor line length L is smaller than π/2.

11. The wireless power transfer system according to claim 3, wherein
a conductor line of the power receiver and a conductor line of the power transmitter are each open-ended at one end, and a product of a phase constant β and a conductor line length L is smaller than π/2.

12. The wireless power transfer system according to claim 4, wherein
a conductor line of the power receiver and a conductor line of the power transmitter are each open-ended at one end, and a product of a phase constant β and a conductor line length L is smaller than π/2.

13. The wireless power transfer system according to claim 6, wherein
a conductor line of the power receiver and a conductor line of the power transmitter are each open-ended at one end, and a product of a phase constant β and a conductor line length L is smaller than π/2.

14. The wireless power transfer system according to claim 7, wherein
a conductor line of the power receiver and a conductor line of the power transmitter are each open-ended at one end, and a product of a phase constant β and a conductor line length L is smaller than π/2.

15. The wireless power transfer system according to claim 8, wherein
a conductor line of the power receiver and a conductor line of the power transmitter are each open-ended at one end, and a product of a phase constant β and a conductor line length L is smaller than π/2.

16. The wireless power transfer system according to claim 9, wherein
a conductor line of the power receiver and a conductor line of the power transmitter are each open-ended at one end, and a product of a phase constant β and a conductor line length L is smaller than π/2.

* * * * *